United States Patent
Oh et al.

(10) Patent No.: US 8,355,571 B2
(45) Date of Patent: Jan. 15, 2013

(54) APPARATUS AND METHOD FOR GENERATING IMAGE FOR CHARACTER REGION EXTRACTION

(75) Inventors: Sang-Wook Oh, Gyeonggi-do (KR); Sang-Hoon Sull, Seoul (KR); Hoon-Jae Lee, Gyeonggi-do (KR); Soon-Hong Jung, Gyeonggi-do (KR); Jun-Sic Youn, Gyeonggi-do (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 174 days.

(21) Appl. No.: 13/015,194

(22) Filed: Jan. 27, 2011

(65) Prior Publication Data

US 2011/0200250 A1    Aug. 18, 2011

(30) Foreign Application Priority Data

Feb. 17, 2010    (KR) .................. 10-2010-0014269

(51) Int. Cl.
  *G06K 9/00*    (2006.01)
  *G06K 9/46*    (2006.01)
  *G06K 9/34*    (2006.01)
(52) U.S. Cl. ....................... 382/165; 382/190
(58) Field of Classification Search ............ 382/100, 382/162, 164, 165, 190, 254, 257–259; 347/131, 347/252
See application file for complete search history.

(56) References Cited

U.S. PATENT DOCUMENTS

| | | | | |
|---|---|---|---|---|
| 5,113,252 | A * | 5/1992 | Horie et al. | 358/528 |
| 5,617,224 | A * | 4/1997 | Ichikawa et al. | 358/530 |
| 5,706,046 | A * | 1/1998 | Eki et al. | 347/252 |
| 5,974,191 | A * | 10/1999 | Harada et al. | 382/258 |
| 6,981,644 | B2 | 1/2006 | Cheong et al. | |
| 2011/0200250 | A1* | 8/2011 | Oh et al. | 382/164 |

FOREIGN PATENT DOCUMENTS

KR  1020010113578   12/2001
KR  1020050065883   6/2005

* cited by examiner

*Primary Examiner* — Amir Alavi

(74) *Attorney, Agent, or Firm* — The Farrell Law Firm, P.C.

(57) ABSTRACT

Provided is an apparatus and method for generating an image for character region extraction. Upon input of an original image, a candidate character image is generated from the original image and a plurality of binarization maps for similar colors are generated from the generated candidate character image. A binarization map including a background region is selected from among the plurality of generated binarization maps, and the background region of the selected binarization map is expanded. The expanded background region is inverted to generate an image including a character region, thereby generating an image for accurately extracting the character region without missing a boundary portion of a character.

12 Claims, 10 Drawing Sheets

FIG.3A    FIG.3B
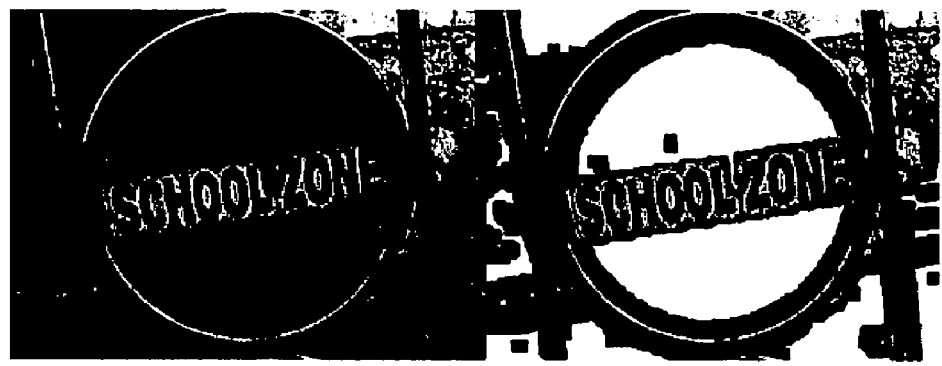
FIG.3C    FIG.3D

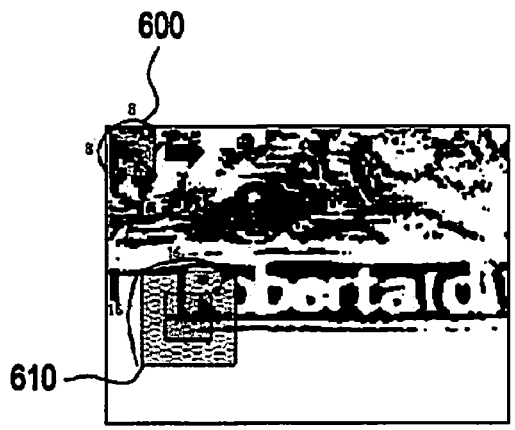
FIG.6A  FIG.6B
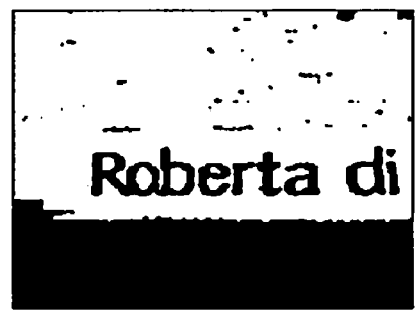
FIG.6C  FIG.6D

APPARATUS AND METHOD FOR GENERATING IMAGE FOR CHARACTER REGION EXTRACTION

PRIORITY

This application claims priority under 35 U.S.C. §119(a) to a Korean Patent Application filed in the Korean Intellectual Property Office on Feb. 17, 2010 and assigned Serial No. 10-2010-0014269, the contents of which are incorporated herein by reference.

BACKGROUND OF THE INVENTION

1. Field of the Invention

The present invention relates generally to an apparatus and method for generating an image for character region extraction, and more particularly, to an apparatus and method for generating an image, by which a background image is extracted from a candidate character region and a correct character region is extracted by using an inverted image of the extracted background image.

2. Description of the Related Art

A character extraction method generally involves recognizing a character included in an image and extracting the recognized character region.

Since a character included in an image usually provides important contents information, it is paramount to recognize a character included in an image, such as a moving image of a cellular phone, a name card image, or a signboard, for understanding of the meaning of the character.

To detect a character included in an image, various methods have been proposed for separating a background and the character.

First, a background and a character may be separated using binarization. The binarization is generally classified into full image binarization for performing binarization on the full image and local image binarization for performing binarization on a part of the full image. These methods advantageously separate a background and a character in simple manners when the background and the character are simple.

Second, there may be color clustering which separates a background and a character according to Red/Green/Blue (RGB) colors instead of individual maps, clusters pixels having similar colors, and generates maps for respective colors. This method can separate the character and the background even when characters have various colors.

Thus, a character in an image has conventionally been extracted using full-image binarization, local-image binarization, or color clustering.

However, the binarization scheme fails to normally separate a background and a character when an image is complex and characters have various colors.

Moreover, the color-clustering scheme cannot normally separate a background and a character when a character may be divided into several regions by an external effect such as light. Furthermore, when analog information is digitalized as shown in FIG. 1, a boundary between a character and a background is also separated due to aliasing 100 generated in the boundary region of an image, whereby a character stroke width is reduced when compared to the original image. As a result, in later character recognition, a portion of a character region may be missed due to the stroke width reduction.

SUMMARY OF THE INVENTION

Accordingly, an aspect of the present invention is to provide an apparatus and method for generating an image for correct character region extraction.

According to an aspect of the present invention, there is provided an apparatus for generating an image for character region extraction, including a binarization map generator for, upon input of an original image, generating a candidate character image from the original image and generating a plurality of binarization maps for similar colors from the generated candidate character image, a background region determiner for selecting a binarization map including a background region from among the plurality of generated binarization maps, and a character region extractor for expanding the background region of the selected binarization map and inverting the expanded background region to generate an image including a character region.

According to another aspect of the present invention, there is provided a method for generating an image for character region extraction, including generating, upon input of an original image, a candidate character image from the original image and generating a plurality of binarization maps for similar colors from the generated candidate character image, selecting a binarization map including a background region from among the plurality of generated binarization maps, and expanding the background region of the selected binarization map and inverting the expanded background region to generate an image including a character region.

BRIEF DESCRIPTION OF THE DRAWINGS

The above and other features and advantages of embodiments of the present invention will be more apparent from the following detailed description taken in conjunction with the accompanying drawings, in which:

FIGS. 3A through 3D illustrate a process of generating a candidate character image by a binarization map generator according to an embodiment of the present invention;

FIGS. 6A through 6D illustrate a process of generating an image including a character region by a character region extractor according to an embodiment of the present invention;

DETAILED DESCRIPTION OF EMBODIMENTS OF THE INVENTION

Hereinafter, embodiments of the present invention will be described in detail with reference to the accompanying drawings. In the following description and the accompanying drawings, well-known functions and structures will not be described for the sake of clarity and conciseness.

Figure 1:
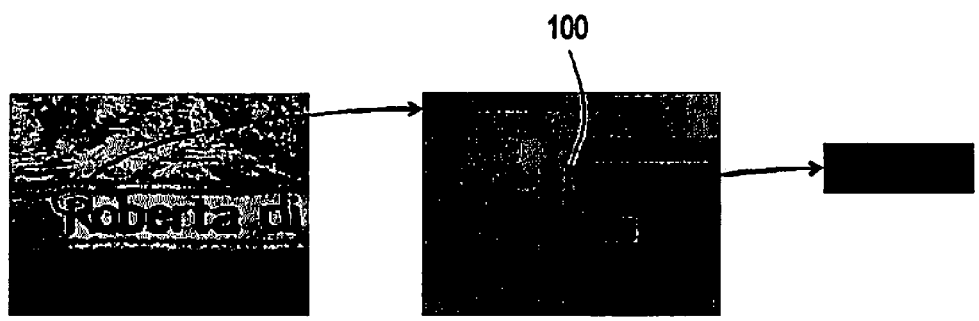
FIG. 1 illustrates a conventional image extraction process.
Figure 2:
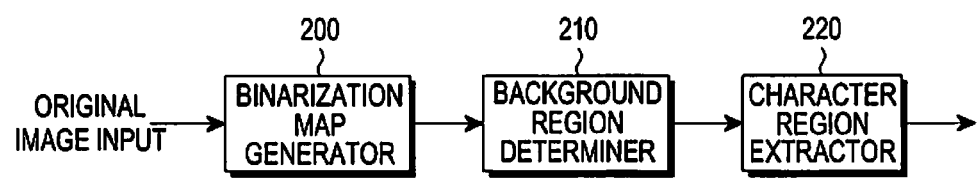
FIG. 2 illustrates an apparatus for generating an image (or an image generating apparatus) according to an embodiment of the present invention.

FIG. 2 illustrates an apparatus for generating an image (or an image generating apparatus) according to an embodiment of the present invention.

Referring to FIG. 2, the image generating apparatus includes a binarization map generator 200, a background region determiner 210, and a character region extractor 220.

The binarization map generator 200 divides an original image into blocks of a predetermined size, calculates an RGB dispersion for each block, and generates a candidate character image by using the calculated RGB dispersion.

More specifically, upon input of the original image, the binarization map generator 200 divides the original image into blocks of a predetermined size and calculates a dispersion of pixel values of each of RGB colors for each block. If any one of dispersions calculated for respective RGB colors for each block is greater than a dispersion threshold, a candidate character image is generated by excluding a corresponding block from the original image. In this manner, upon input of original images as shown in FIGS. 3A and 3C, the binarization map generator 200 outputs candidate character images as shown in FIGS. 3B and 3D.

Next, the binarization map generator 200 generates a binarization map for each color region having similar colors by calculating differences in color value between all pixels of the candidate character image.

More specifically, the binarization map generator 200 generates a color table by mapping a color corresponding to each of a plurality of seed points and RGB values of the color.

For example, it is assumed that a color table as shown in Table 1 is generated in which RGB values corresponding to each of 8 colors such as black, white, red, green, blue, yellow, pink, and sky-blue and seed values 1 through 8 are mapped.

TABLE 1

| Seed Point | R | G | B | Color |
|---|---|---|---|---|
| 1 | 0 | 0 | 0 | Black |
| 2 | 255 | 255 | 255 | White |
| 3 | 255 | 0 | 0 | Red |
| 4 | 0 | 255 | 0 | Green |
| 5 | 0 | 0 | 255 | Blue |
| 6 | 255 | 255 | 0 | Yellow |
| 7 | 255 | 0 | 255 | Pink |
| 8 | 0 | 255 | 255 | Sky-blue |

The binarization map generator 200 calculates a difference between RGB values for each pixel included in the candidate character image and RGB values corresponding to each seed point included in the color table, and includes corresponding pixels in a seed point having the smallest RGB value difference among the calculated differences.

Upon completion of pixel sorting for all pixels of the candidate character image, the binarization map generator 200 checks the number of pixels included in each seed point to remove a seed point having pixels the number of which is less than a threshold value and items corresponding to the seed point from the color table. The binarization map generator 200 then includes the pixels included in the removed seed point in a seed point corresponding to RGB values having the next smallest RGB value difference.

The binarization map generator 200 calculates average RGB values of pixels included in each seed point and includes corresponding pixels in a seed point corresponding to RGB values, a difference between which and the calculated average RGB values is smallest.

The binarization map generator 200 repeats the foregoing operations until no more seed point update is made.

Figures 4A, 4B, 4C:
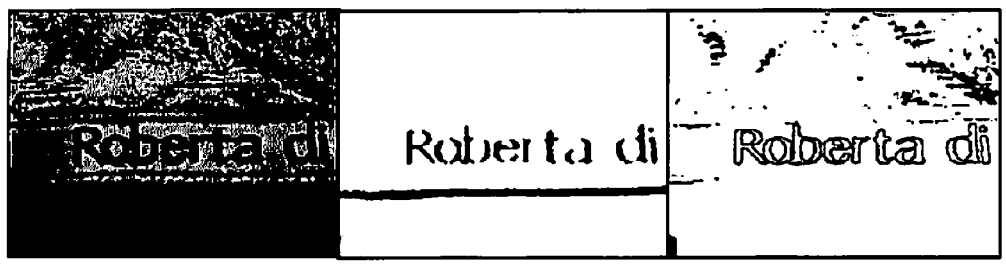
FIGS. 4A through 4F illustrate a process of outputting a plurality of binarization maps for similar colors by the binarization map generator according to an embodiment of the present invention.
Figures 4D, 4E, 4F:
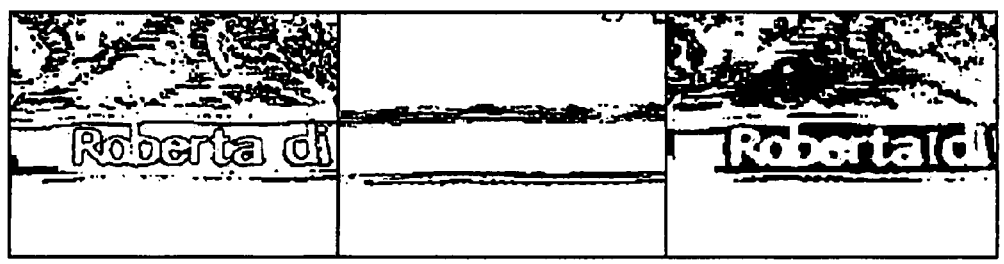

Once the seed point update is finished, the binarization map generator 200 outputs a plurality of binarization maps including a cluster of consecutive pixels having similar colors in the candidate character image. An example of the output binarization maps is shown in FIGS. 4A through 4F. FIG. 4A illustrates the original image, FIGS. 4B and 4C illustrate character regions, FIG. 4D illustrates an aliasing region generated in a boundary between characters and a background, and FIGS. 4E and 4F illustrate separated background regions.

The background region determiner 210 selects a binarization map determined as a background region that excludes characters from the original image.

Figure 5A:
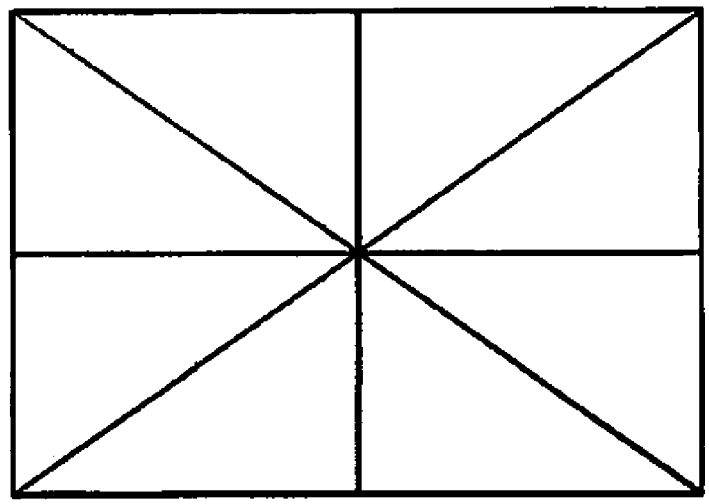
FIGS. 5A and 5B illustrate a process of selecting an image including a background region based on scan lines by a background region determiner according to an embodiment of the present invention.

More specifically, the background region determiner 210 scans a binarization map generated for each color along scan lines. Scan lines are predetermined. For example, FIG. 5A illustrates 4 scan lines having a radial form. The background region determiner 210 determines consecutive pixels having a value along each scan line in each binarization map as a group of consecutive pixels in predetermined directions to check the number of consecutive pixels having a continuous color along each scan line.

Figure 5B:
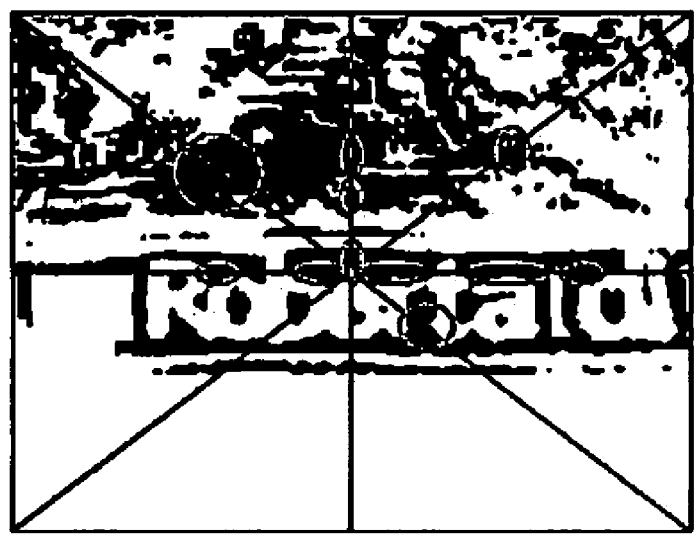

If the pixel number of a group of consecutive pixels is greater than or equal to a threshold value, the background region determiner 210 determines the group of consecutive pixels as a pixel cluster. FIG. 5B shows an example of a pixel cluster, which each pixel cluster is marked by a circle.

The background region determiner 210 counts the number of pixel clusters for each binarization map and determines a binarization map having the largest number of pixel clusters as a binarization map including a background region.

The character region extractor 220 expands the background region in the binarization map, determined as the background region, by using the original image and inverts the background region to extract a character region.

More specifically, FIGS. 6A through 6D illustrate a process of generating an image including a character region by a character region extractor according to an embodiment of the present invention. Referring to FIG. 6A, the character region extractor 220 scans a binarization map in the unit of an m×n block 600, such that if there is a binarization pixel in a corresponding block, the character region extractor 220 expands that block to an M×N block 610. Herein, m, n, M, and N are natural numbers and M and N are greater than m and n. For example, as shown in FIG. 6A, scanning may be performed in the unit of an 8×8 block and expansion may be performed to a 16×16 block.

The character region extractor 220 calculates average RGB values of a pixel region of the original image, which corresponds to a binarization pixel region of the expanded block.

The character region extractor 220 then calculates a difference between the calculated RGB averages and RGB values of each of pixels remaining after excluding a binarization pixel from an m×n block, such that if the calculated difference is less than a threshold value, the character region extractor 220 converts a corresponding pixel having such a difference into a binarization pixel to expand the background region.

Once an operation for conversion into a binarization pixel is completed for the last pixel of the candidate character image, the character region extractor 220 inverts a resultant image to generate an image for character region extraction.

In other words, the present invention may generate an image for character region extraction as shown in FIG. 6D by expanding the background region of the binarization map as shown in FIG. 6B to the image as shown in FIG. 6C and inverting the expanded image.

As such, the present invention selects a background of a character in a binarization map for character extraction and inverts the selected background, thereby generating an image that allows accurate character region extraction.

Figure 7:
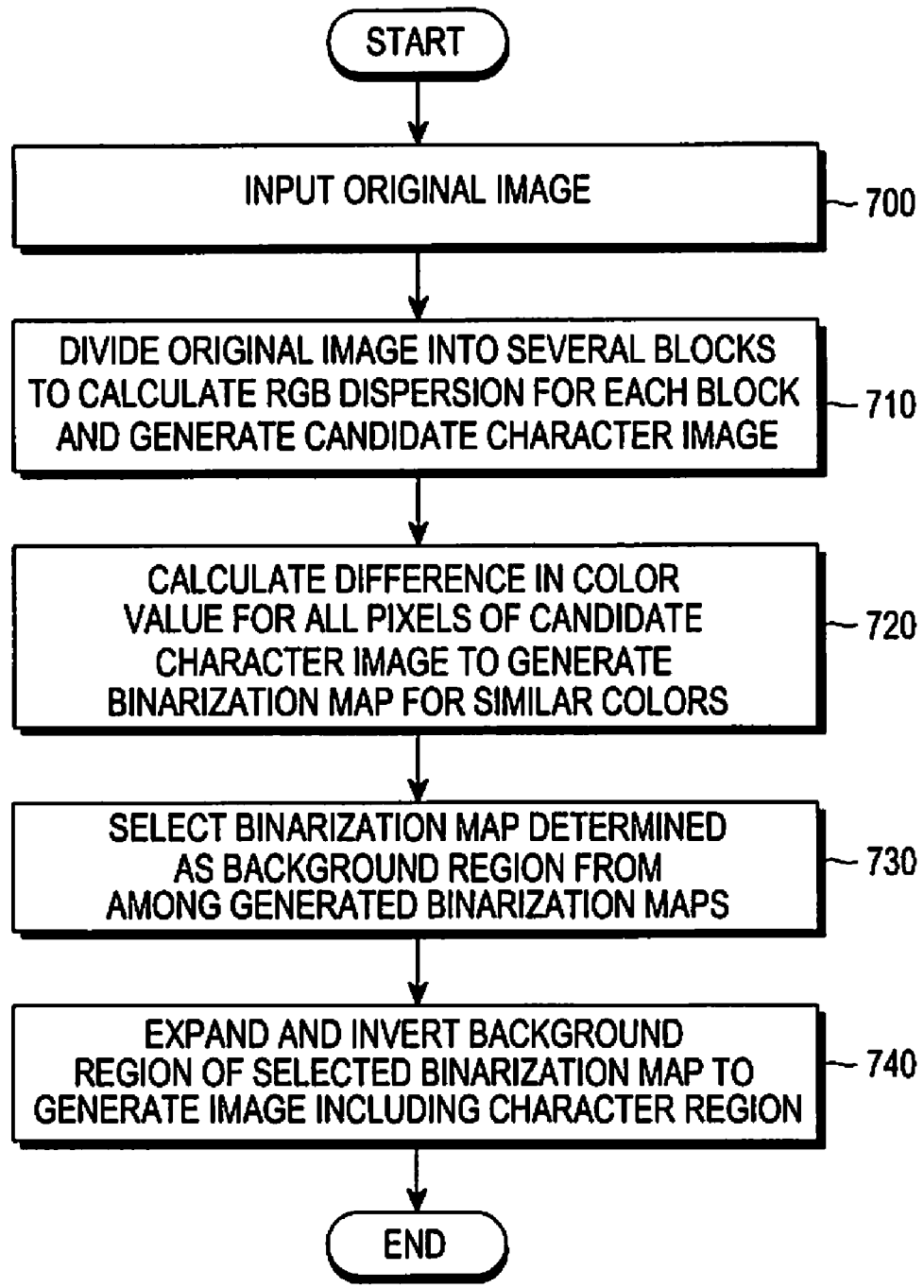
FIG. 7 illustrates a process of generating an image including a boundary-improved character region by the image generating apparatus according to an embodiment of the present invention.

FIG. 7 illustrates a process of generating an image for character region extraction by the image generating apparatus according to an embodiment of the present invention.

Upon input of an original image in step 700, the binarization map generator 200 divides the original image into several blocks to calculate an RGB dispersion for each block and generates a candidate character image in step 710. Herein, the candidate character image indicates a region that includes a candidate character region and excludes a region expected as a background therefrom.

In step 720, the binarization map generator 200 calculates differences in color value between all pixels of the candidate character image to generate a binarization map for similar colors. This step will now be described in more detail with reference to FIG. 8.

Figure 8:
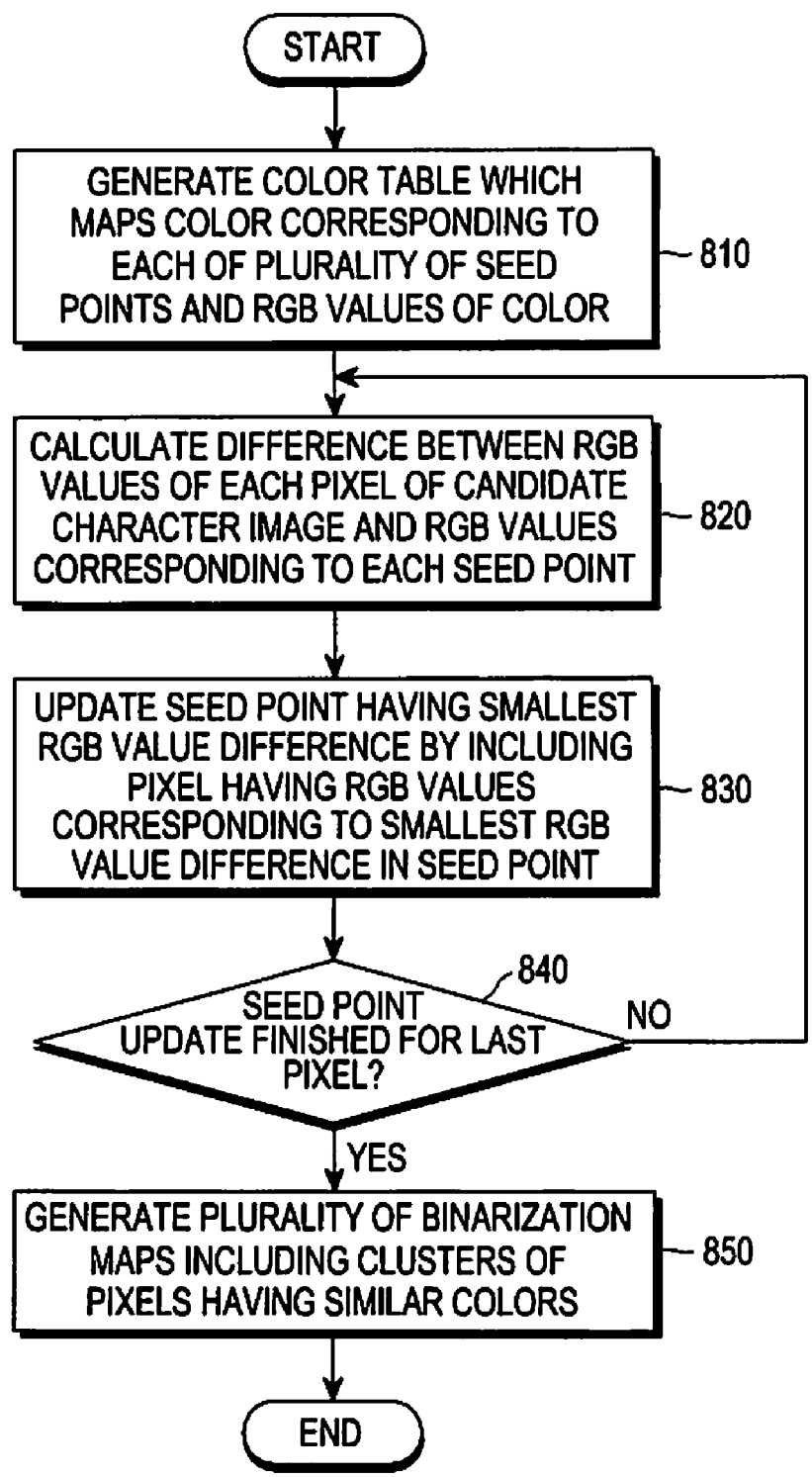
FIG. 8 illustrates a process of generating a plurality of binarization maps for similar colors by the binarization map generator according to an embodiment of the present invention.

FIG. 8 illustrates a process of generating a binarization map for each color by the binarization map generator 200 according to an embodiment of the present invention.

In step 810, the binarization map generator 200 generates a color table that maps a color corresponding to each of a plurality of seed points and RGB values of the color. The generated color table may be as shown above in Table 1.

In step 820, the binarization map generator 200 calculates a difference between RGB values of each pixel of the candidate character image and RGB values corresponding to each seed point in the color table.

In step 830, the binarization map generator 200 updates a seed point having the smallest RGB value difference among the calculated RGB value differences by including a pixel having RGB values corresponding to the smallest RGB value difference in the seed point.

In step 840, the binarization map generator 200 determines whether seed point update has been completed with respect to the last pixel of the candidate character image and if so, proceeds to step 850. Otherwise, the binarization map generator 200 returns to step 820 to calculate a difference in RGB value and repeat steps 830 and 840 until seed point update is performed for the last pixel.

In step 850, the binarization map generator 200 generates a plurality of binarization maps including clusters of consecutive pixels having similar colors. For example, the binarization map generator 200 may generate binarization maps corresponding to eight (8) colors as shown in Table 1.

Returning now to step 730 of FIG. 7, the background region determiner 210 selects a binarization map determined as a background region from among the plurality of generated binarization maps, as will now be described in more detail with reference to FIG. 9.

Figure 9:
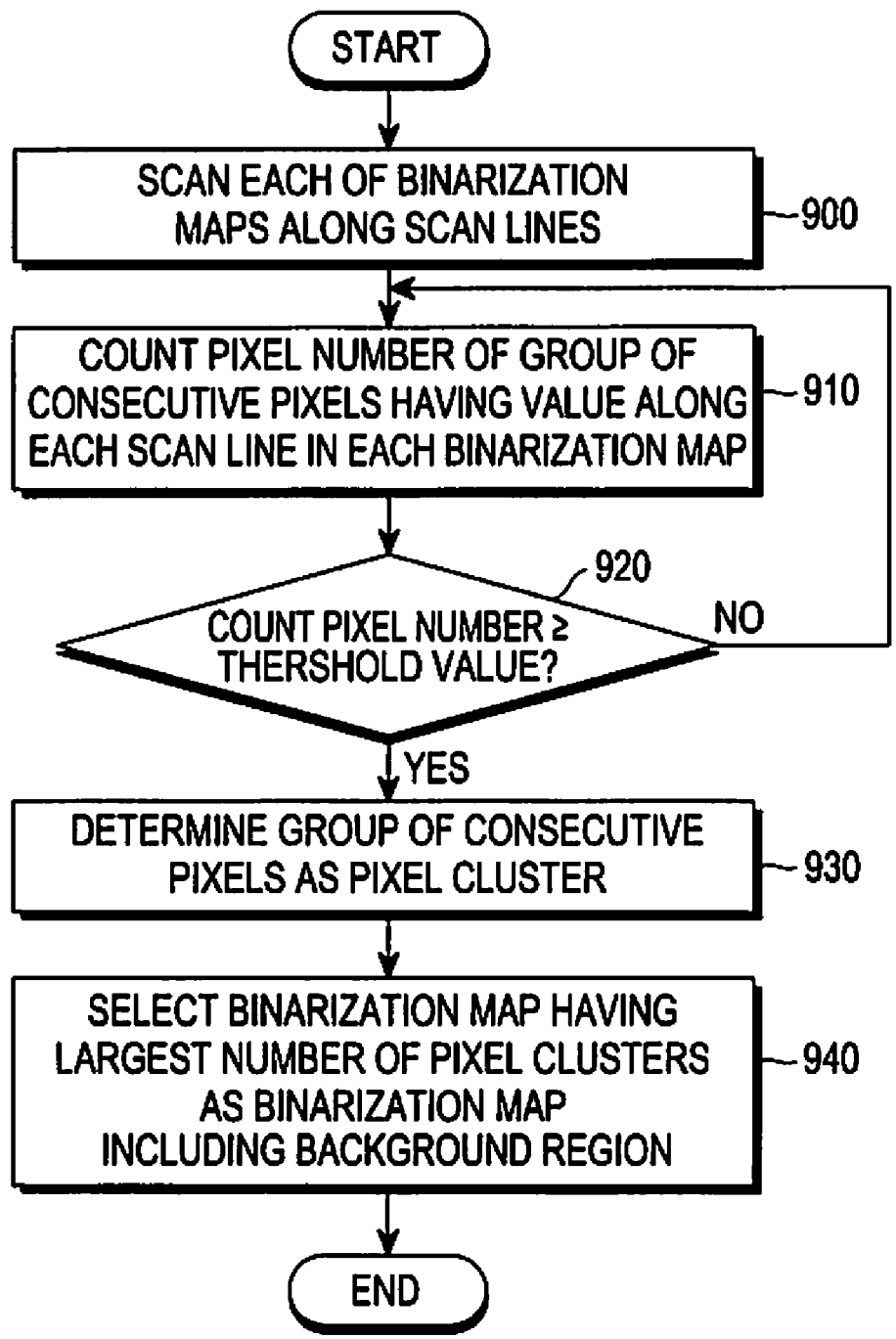
FIG. 9 illustrates a process of selecting an image including a background region based on scan lines by the background region determiner according to an embodiment of the present invention.

FIG. 9 illustrates a process of selecting a binarization map determined as a background region by the background region determiner 210 according to an embodiment of the present invention.

In step 900, the background region determiner 210 scans each of the binarization maps along scan lines which may be as shown in FIG. 5A.

In step 910, the background region determiner 210 counts the pixel number of a group of consecutive pixels having a value along each scan line in each binarization map. For example, if there is a group of consecutive pixels having a value along the scan lines as shown in FIG. 5B, the pixel number of such group is counted.

In step 920, the background region determiner 210 determines whether the pixel number of a group is greater than or equal to a threshold value, and if so, proceeds to step 930 and determines a group of consecutive pixels, the pixel number of which is greater than or equal to the threshold value, as a pixel cluster. Otherwise, the background region determiner 210 returns to step 910 to count the pixel number of a group of consecutive pixels having a value.

In step 940, the background region determiner 210 selects the binarization map having the largest number of pixel clusters determined along the scan lines as a binarization map including a background region.

Returning now to step 740 of FIG. 7, the character region extractor 220 expands the background region of the selected binarization map and inverts the background region, thereby generating an image including a character region, as will now be described in more detail with reference to FIG. 10.

Figure 10:
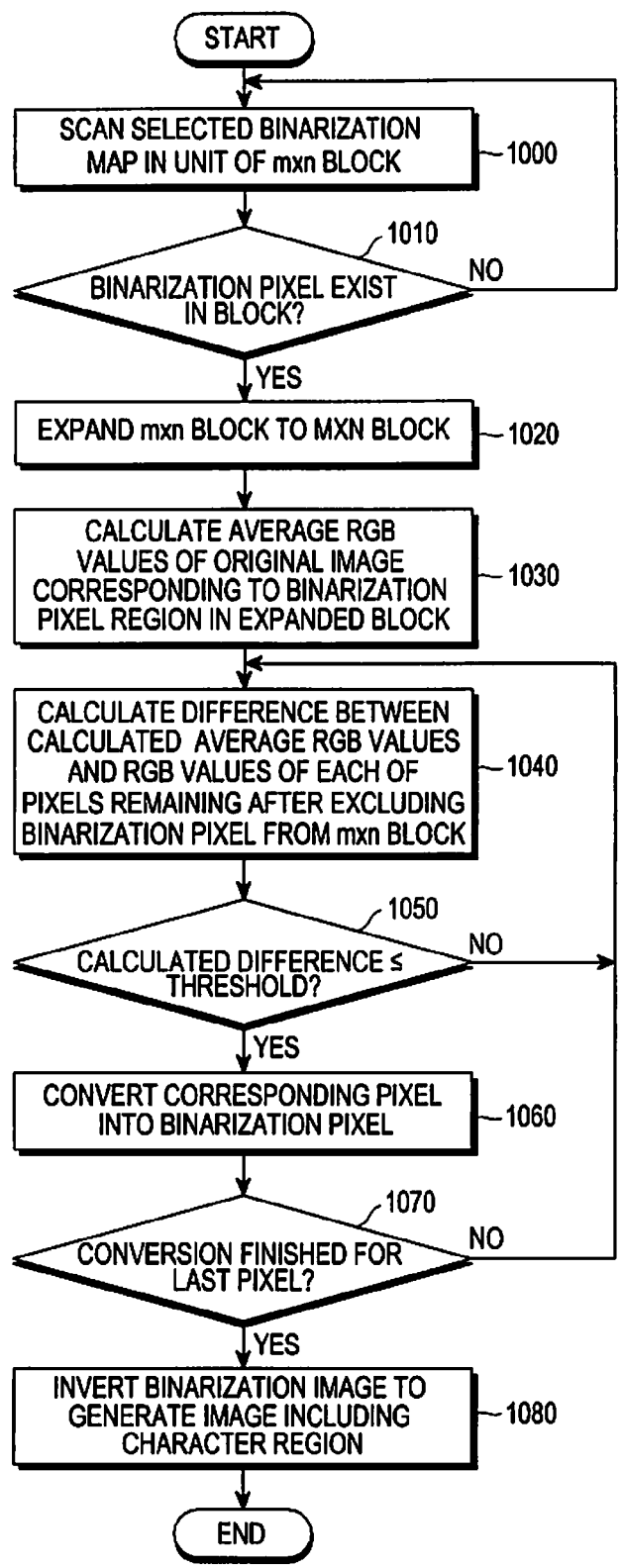
FIG. 10 illustrates a process of generating an image including a character region by the character region extractor according to an embodiment of the present invention.

FIG. 10 illustrates a process of generating an image including a character region by the character region extractor 220 according to an embodiment of the present invention.

In step 1000, the character region extractor 220 scans the selected binarization map in the unit of an m×n block, in which m and n are natural numbers.

In step 1010, the character region extractor 220 determines whether a binarization pixel exists in an m×n block, and if so, proceeds to step 1020. Otherwise, the character region extractor 220 returns to step 1000 to continue block-based scanning.

In step 1020, the character region extractor 220 expands an m×n block where a binarization pixel exists to an M×N block, in which M and N are natural numbers and are greater than m and n.

In step 1030, the character region extractor 220 calculates average RGB values of the original image corresponding to a binarization pixel region in the expanded block. The character region extractor 220 may calculate each of an average R value, an average G value, and an average B value of the original image or an average value of RGB values.

In step 1040, the character region extractor 220 compares the calculated average RGB values with pixels remaining after excluding a binarization pixel from an m×n block to calculate a difference between the calculated average RGB values and RGB values of each pixel.

In step 1050, the character region extractor 220 determines whether the calculated difference is less than or equal to a threshold value, and if so, proceeds to step 1060 and converts a pixel having a difference less than the threshold value into a binarization pixel. Otherwise, the character region extractor 220 returns to step 1040 to continue calculating a difference between the calculated average RGB values with RGB values of each of the other pixels.

In step 1070, the character region extractor 220 determines whether binarization pixel conversion is completed for the last pixel of the m×n block, and if so, proceeds to step 1080 and inverts a binarization image which has undergone binarization pixel conversion to generate an image including a character region, and then terminates an image generating operation. Otherwise, the character region extractor 220 returns to step 1040 to continue calculating a difference between the calculated average RGB values with RGB values of each of the other pixels, and then performs steps 1050, 1060, and 1070.

As is apparent from the foregoing description, a background of a character is selected in a binarization map for character extraction and is inverted, thereby generating an image for accurately extracting a character region without missing a boundary portion of a character.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for generating an image for character region extraction, the apparatus comprising:
    a binarization map generator for generating, upon input of an original image, a candidate character image from the original image and generating a plurality of binarization maps for quantized colors from the generated candidate character image;
    a background region determiner for selecting a binarization map having a background region from among the plurality of generated binarization maps; and
    a character region extractor for expanding the background region of the selected binarization map and inverting the expanded background region to generate an image having a character region.

2. The apparatus of claim 1, wherein the binarization map generator divides the original image into several blocks and calculates Red/Green/Blue (RGB) dispersions for the respective blocks, and if at least one of the calculated RGB dispersions is greater than or equal to a threshold value, the binarization map generator generates the candidate character image by excluding a block having the RGB dispersion being greater than or equal to the threshold value from the original image.

3. The apparatus of claim 2, wherein the binarization map generator previously generates a color table that maps a color corresponding to each of a plurality of seed points and RGB values of the color.

4. The apparatus of claim 3, wherein the binarization map generator calculates a difference between RGB values of each pixel of the candidate character image and RGB values corresponding to each of the plurality of seed points, and updates a seed point having the smallest RGB difference by including a pixel having RGB values corresponding to the smallest RGB value difference in the seed point.

5. The apparatus of claim 4, wherein the background region determiner scans each of the plurality of binarization maps along scan lines to determine the number of consecutive pixels having a continuous color along each of the scan lines, and if the determined number of pixels is greater than a threshold value, the background region determiner determines the consecutive pixels having the continuous color as a pixel cluster and selects a binarization map having the largest number of pixel clusters determined along the scan lines as the binarization map including the background region.

6. The apparatus of claim 5, wherein the character region extractor scans the selected binarization map in the unit of a block having a first size, and if a binarization pixel exists in the scanned block, the character region extractor expands the block of the first size to a block of a second size.

7. The apparatus of claim 6, wherein the character region extractor calculates average RGB values of the original image corresponding to a binarization pixel region of the expanded block of the second size and calculates a difference between the calculated average RGB values and RGB values of each of pixels remaining after excluding a binarization pixel from the block of the first size, such that if the calculated difference is less than a threshold, the character region extractor converts each of the other pixels into a binarization pixel and upon completion of the conversion, inverts a binarization pixel region including the converted binarization pixel.

8. A method for generating an image for character region extraction, the method comprising:
    generating, upon input of an original image, a candidate character image from the original image and generating a plurality of binarization maps for quantized colors from the generated candidate character image;
    selecting a binarization map having a background region from among the plurality of generated binarization maps; and
    expanding the background region of the selected binarization map and inverting the expanded background region to generate an image having a character region.

9. The method of claim 8, wherein generating the candidate character image comprises:
    dividing the original image into several blocks to calculate Red/Green/Blue (RGB) dispersions for the respective blocks; and
    if at least one of the calculated RGB dispersions is greater than or equal to a threshold value, excluding a block having the RGB dispersion being greater than or equal to the threshold value from the original image.

10. The method of claim 9, wherein generating the plurality of binarization maps comprises:
    generating a color table which maps a color corresponding to each of a plurality of seed points and RGB values of the color; and
    calculating a difference between RGB values of each pixel of the candidate character image and RGB values corresponding to each of the plurality of seed points and updating a seed point having the smallest RGB difference by including a pixel having RGB values corresponding to the smallest RGB value difference in the seed point.

11. The method of claim 10, wherein selecting the binarization map comprising the background region comprises:
    scanning each of the plurality of binarization maps along scan lines;
    determining the number of consecutive pixels having a continuous color along each of the scan lines;
    if the determined number of pixels is greater than a threshold value, determining the consecutive pixels having the continuous color as a pixel cluster; and
    selecting a binarization map having the largest number of pixel clusters determined along the scan lines as the binarization map including the background region.

12. The method of claim 11, wherein generating the image comprising the character region comprises:
    scanning the selected binarization map in the unit of a block having a first size;
    if a binarization pixel exists in the scanned block, expanding the block of the first size to a block of a second size;
    calculating average RGB values of the original image corresponding to a binarization pixel region of the expanded block of the second size;
    calculating a difference between the calculated average RGB values and RGB values of each of pixels remaining after excluding a binarization pixel from the block of the first size;
    if the calculated difference is less than a threshold, converting each of the other pixels into a binarization pixel; and
    upon completion of the conversion, inverting a binarization pixel region including the converted binarization pixel.

* * * * *